United States Patent
Pu et al.

(10) Patent No.: US 8,414,799 B2
(45) Date of Patent: Apr. 9, 2013

(54) METHOD FOR MANUFACTURING GRAPHENE

(75) Inventors: Nen-Wen Pu, Daxi Township, Taoyuan County (TW); Chung An Wang, Banqiao (TW); Yuh Sung, Zhongli (TW); Ming-Der Ger, Daxi Township, Taoyuan County (TW)

(73) Assignee: National Defense University, Bade, Taoyuan County (TW)

( * ) Notice: Subject to any disclaimer, the term of this patent is extended or adjusted under 35 U.S.C. 154(b) by 166 days.

(21) Appl. No.: 12/818,940

(22) Filed: Jun. 18, 2010

(65) Prior Publication Data

US 2011/0311432 A1   Dec. 22, 2011

(51) Int. Cl.
*C04B 14/00* (2006.01)
(52) U.S. Cl. .................. 252/378 R; 423/445 R
(58) Field of Classification Search .............. 252/378 R; 423/445 R
See application file for complete search history.

(56) References Cited

U.S. PATENT DOCUMENTS

| 7,105,108 | B2 * | 9/2006 | Kaschak et al. | 252/378 R |
| 7,157,517 | B2 * | 1/2007 | Gulari et al. | 524/494 |
| 2010/0055458 | A1 * | 3/2010 | Jang et al. | 428/402 |

OTHER PUBLICATIONS

"Sodium Dodecyl Sulphate MSDS". USB Corp. Aug. 8, 2002.*
"Zonyl FSO Sale Sheer". Dupont. 2008.*
Nen-Wen Pu, Chung-An Wang, Yu Sung, Yih-Ming Liu, and Ming-Der Ger; Production of Few-Layer Graphene by Supercritical $Co_2$ Exfoliation of Graphite; *Material Letters*; Jun. 22, 2009; p. 1987-p. 1989.

* cited by examiner

*Primary Examiner* — Stanley Silverman
*Assistant Examiner* — Richard M Rump
(74) *Attorney, Agent, or Firm* — Muncy, Geissler, Olds & Lowe, PLLC

(57) ABSTRACT

A method for manufacturing graphene is disclosed, which comprises the following steps: putting graphite material and an organic solvent, a surfactant, or a combination thereof in a reaction tank and introducing a supercritical fluid in the reaction tank to allow the organic solvent, the surfactant, or the combination thereof to dissolve in the supercritical fluid and to permeate into the graphite material; and removing the supercritical fluid by depressurization to form graphene. The method of the present invention has simple steps and reduced consumption of manufacturing time, and also can promote the quality of the resultant graphene in large-scale manufacturing.

14 Claims, 5 Drawing Sheets

METHOD FOR MANUFACTURING GRAPHENE

BACKGROUND OF THE INVENTION

1. Field of the Invention

The present invention relates to a method for manufacturing graphene and, more particularly, to a method for manufacturing graphene without complex steps, and with short manufacturing time, high quality graphene, and capability of mass-production.

2. Description of Related Art

Graphene becomes an attractive material for many applications because of its high thermal conductivity, excellent mechanical stiffness, good fracture strength, and outstanding electrical mobility, and thus it has in recent years. Even though graphene-based devices still are not made, the application of graphene serving as a filler material of polymeric nanocomposites can be seen nowadays. Notwithstanding, searching a method for efficiently mass-producing pure and well-distributed graphene sheets is still an important issue for researchers.

The mechanical cleavage of graphite is known as an easy way to obtain pure graphene, and has been widely used by many researchers. Unfortunately, the yield is too low for mass-production. Besides, one researcher reported another method described by the following steps. First, graphite powder or graphite fibers were dipped in a mixture containing strong oxidants such as sulfuric acid and nitric acid. Then, the mixing composite is uniformly oxidized into exfoliated graphite oxides, and washed with water to remove acidic solution until being neutral. The resultant graphite oxides were promptly expanded and exfoliated in a furnace at a high temperature from 1100 to 1250° C. to form 2D graphene. Alternatively, graphite in several hundred grams was oxidized with sulfuric and nitric acids to form exfoliated graphite composites, and then washed with deionized water to afford expanded graphite. After the expanded graphite was thermally treated at different temperatures, i.e. 600° C. and 1050° C., it was spread in water and ultrasonicated for exfoliation, and finally ground by a ball mill to form nanoscale graphene. Nevertheless, the described methods which include mixed acids and thermal treatment still contains complex steps, and thus it is difficult to apply such methods for mass-production.

In addition to the methods mentioned above, some researchers reported another method to form graphene. First, The graphite oxides were prepared by Hummer method, then spin-coated on a silica substrate, and reduced with vapor of hydrazine hydrates at 100° C. for 20 hours subsequently to form graphene. However, this method only can prepare the graphene having functional groups thereon. Alternatively, in another method, nickel (100 nm) was used as a catalyst layer, and deposited by sputtering on a silica substrate for forming graphene. In this method carbon sources such as ethylene were introduced in the chamber of sputtering deposition, then decomposed into carbon, and deposited on the nickel layer. Thus, layered graphene was formed on the nickel layer. Finally, the substrate was dipped in 0.1 M HCl aqueous solution for etching the nickel layer, and then graphite was obtained. Although this method can produce layered graphene on a large-scale substrate and it seems to have potential for mass-production of graphene, decomposition of carbon sources needs to be carried out at a high temperature (950° C.) to deposit carbon in a specific lattice orientation, otherwise an amorphous carbon film forms easily.

In addition, some researchers reported the following method. Polydimethylsiloxane (PDMS) and graphite powder was mixed in a ratio of 1:10, and a supercritical fluid ($CO_2$) was introduced to dissolve PDMS and to insert it into graphite powder. After PDMS and graphite were mixed uniformly, the supercritical fluid was removed by prompt depressurization, and exfoliation occurred among layers of graphite powder to give graphene. Although this method can make produce graphene without covalent aggregation to form graphite, the prepared graphene is not clean, pure, and totally exfoliated since some foreign molecules or polymers (ex. PDMS) are present therein. However, the presence of foreign molecules or polymers in graphene is undesirable in many current applications.

Accordingly, even though there are many methods for preparing graphene currently, for example, coating, mechanical nanogrinding, heteroepitaxial growth, the use of mixed solution plus thermal treatment, oxidation-reduction, and exfoliation of carbon nanotubes, these methods either have to be applied in a limited condition, or produce little amounts only for scientific researches. In addition, some of these methods include complex steps, and thus it is difficult to apply these methods for mass-production. Notwithstanding chemical vapor deposition, one of these methods, can realize mass-production, it is easy to produce amorphous carbon film in chemical vapor deposition. Therefore, there is an urgent need to produce graphite nanalms (graphene) with high quality in mass-production so as to benefit the development of nanotechnology.

SUMMARY OF THE INVENTION

The object of the present invention is to provide a method for manufacturing graphene. In the method, synergistic effect is achieved by a supercritical fluid together with a specific organic solvent, a surfactant, or a combination thereof to afford graphene by exfoliation of graphite. During exfoliation of graphite, resultant graphene may directly disperse among the surfactant, the specific organic solvent, or a combination thereof and thus not covalently aggregate together to form graphite again.

To achieve the object, one aspect of the present invention provides a method for manufacturing graphene, which includes the following steps: putting an organic solvent, a surfactant, or a combination thereof and graphite material in a reaction tank, and introducing a supercritical fluid in the reaction tank to allow the organic solvent, the surfactant, or the combination thereof to dissolve in the supercritical fluid and to permeate into the graphite material; and removing the supercritical fluid by depressurization to form graphene.

When the graphite material is mixed with the surfactant, the abovementioned method further includes a step: introducing the graphene into an aqueous solution at the time of removing the supercritical fluid by depressurization. Hence, the surfactant can be successfully dissolved in the aqueous solution.

Natural or synthetic graphite both can serve as the graphite material. The graphite material and the surfactant are preferably in a form of powder. Their particle size is not particularly limited, but preferably is in a range from 20 to 100 µm. In addition, a ratio of the graphite material to the surfactant is not specially limited, but preferably is in a range from 2:1 to 1:10 by weight.

Another aspect of the present invention provides a method for manufacturing graphene, which includes the following steps: putting graphite material in a reaction tank, and introducing a supercritical fluid in the reaction tank; and removing the supercritical fluid by depressurization to form graphene, and simultaneously to introduce the graphene into an organic solvent, a surfactant-containing organic solvent, or a surfactant-containing aqueous solution.

In the method mentioned above, the surfactant-containing solution is an aqueous solution. The kind of the surfactant is not particularly limited. An anionic surfactant, a cationic surfactant, a nonionic surfactant, or a combination thereof is exemplified. Besides, the usable organic solvent preferably is selected from $C_{1-5}$ alcohol, $C_{2-6}$ ester, $C_{3-7}$ ketone, and $C_{5-9}$ alkane, or a combination thereof.

In the method mentioned above, the retention time of the supercritical fluid introduced in the reaction tank may be several minutes to hours, but preferably, for example, is in a range from 15 minutes to 24 hours.

Furthermore, the rate of the depressurization of the supercritical fluid is not specially limited, but prompt depressurization is preferable, for example, in a rate from 0.1 to 5 mL/s. The supercritical fluid may be totally removed within several seconds to hours, for example 5 seconds, 30 seconds, 5 minutes, 20 minutes, one hours, two hours, and 5 hours.

Accordingly, the present invention applies a supercritical fluid. In detail, graphite and an organic solvent, a surfactant, or a combination thereof are first mixed in a high-pressure reactor, and then a supercritical fluid is introduced in the reactor. The graphite and the organic solvent, the surfactant, or the combination thereof is dipped in the supercritical fluid. The organic solvent, the surfactant, or the combination is dissolved in the supercritical fluid thereby to permeate into the graphite. During depressurization, the supercritical fluid permeating into the graphite expands to exfoliate graphite. Alternatively, graphite is placed in a high-pressure reactor, and then a supercritical fluid is introduced in the reactor. The graphite is dipped in the supercritical fluid. During depressurization, exfoliated graphene is formed and transported by the lost supercritical fluid into an organic solvent, a surfactant-containing organic solvent, or a surfactant-containing solution. Therefore, the organic solvent, the surfactant, or the combination thereof can achieve the prevention of formation of graphite by graphene.

As a result, in the method of the present invention for manufacturing graphene has following advantages. First, there is no need to perform complex steps and the production of graphene can be accomplished within a short period. Second, the use of a specific supercritical fluid which can not react with graphite may prepare graphene that is not surface-functionalized and has no defects so as to promote the quality of the graphene. Thirdly, if functionalized graphene is demanded, the use of a specific supercritical fluid which can react with graphite can also afford surface-functionalized graphene. Fourthly, when graphene dipped in a supercritical fluid is carried by the supercritical fluid during depressurization directly into the organic solvent or the surfactant-containing solution, it is preventable that graphite is formed by graphene due to its attraction. Fifthly, the large-scale production of graphene can be realized so as to benefit the application of graphene in the future.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
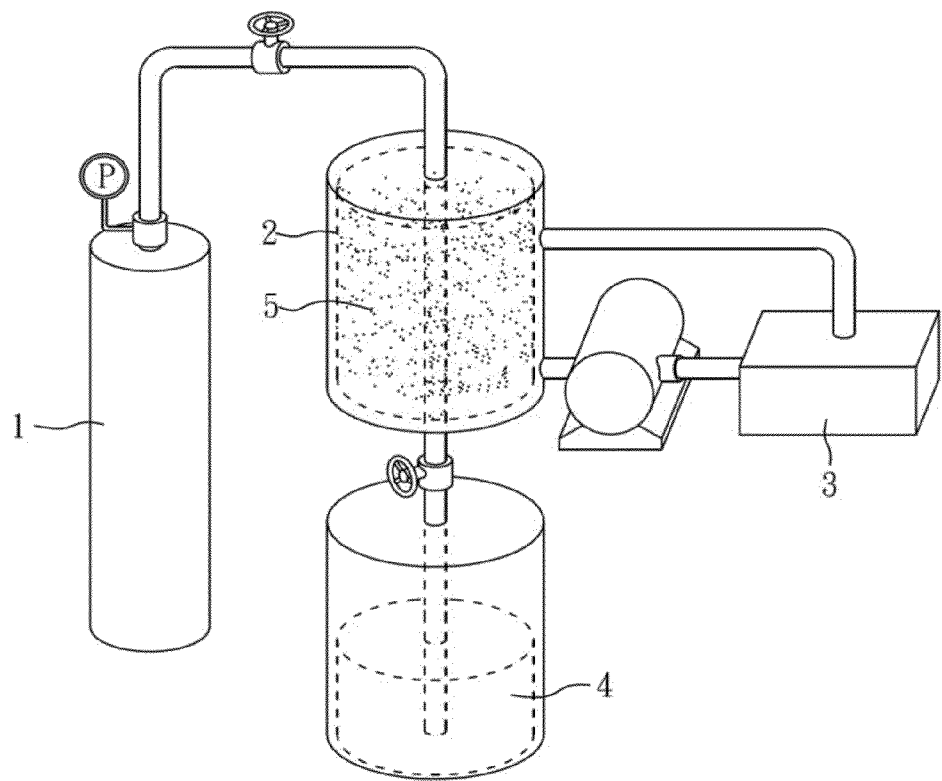
FIG. 1 is a perspective view of experimental equipment in Example 1 of the present invention.

The present invention applies a supercritical fluid. In detail, multi-layered graphite and an organic solvent, a surfactant, or a combination thereof are mixed in a high-pressure reactor. A supercritical fluid having high ability of permeation is used to carry the organic solvent, the surfactant, or the combination thereof and together permeate into graphite. During slow or prompt depressurization, the supercritical fluid permeating into the graphite expands to exfoliate graphite to form graphene.

Alternatively, graphite powder is first mixed with a supercritical fluid and the supercritical fluid permeates into the graphite powder. During depressurization, exfoliated graphene is formed and transported by the lost supercritical fluid into an organic solvent or a surfactant-containing solution. Because the prepared graphene is uniformly mixed with the organic solvent, the surfactant, or the combination thereof, it is preventable that graphene attracts each other due to Van der Waals force to form graphite powder.

The supercritical fluid used in the method is supplied by respectively increasing a temperature and pressure of a proper substrate beyond the critical temperature and pressure of the substrate. Accordingly, the supercritical fluid is not particularly limited as long as it does not specially react with graphite. $CO_2$, $NH_3$, methane, ethane, and ethene supercritical fluids and so forth or a combination thereof are exemplified.

In the method of the present invention, the retention time of the supercritical fluid introduced in the reaction tank may be determined according to circumstances. For example, 20 minutes, and half, one, two, four, and eight hours are possible retention time.

Referring to the organic solvent used in the method of the present invention, it is desirable that organic solvents used can make graphene disperse uniformly and be easily removable. In general, low-carbon organic solvents are preferable, for example, $C_{1-5}$ alcohol, $C_{2-6}$ ester, $C_{3-7}$ ketone, and $C_{5-9}$ alkane, or a combination thereof. In regard to $C_{1-5}$ alcohol, ethanol, isopropanol, and cyclopentanol are exemplified. In regard to $C_{2-6}$ ester, ethyl acetate, methyl propionate, and methyl isopropionate are exemplified. In regard to $C_{3-7}$ ketone, acetone, butanone, and N-methyl-2-pyrrolidone (NMP) are exemplified. In regard to $C_{5-9}$ alkane, octane, heptane, and o-dichlorobenzene (ODCB) are exemplified.

In addition, referring to usable cationic surfactants in the method of the present invention, cetyltrimethylammonium bromide (CTAB or CTMAB), tetradecylpyridinium bromide (TPB), cetylpyridinium chloride (CPC), and cetylpyridinium bromide (CPB) are exemplified. Referring to usable anionic surfactants, sodium dodecyl sulfate (SDS), sodium dodecylbenzenesulfonate (SDBS), sodium dodecanoyl isethionate (SDI), and sodium lauryl sulfate (SLS) are exemplified. Referring to usable nonionic surfactants, Igepal series (ex. CO-890), Tween series (ex. 80), Span series (ex. 80), Brij series (ex. 30), Tergitol series (ex. NP-10), and Triton series (ex. X-100) are exemplified.

In the method of the present invention, if surfactant powder is used, the ratio of the graphite powder to the surfactant can be in a range from 2:1 to 1:10 by weight, for example, 1:1, 1:2, and 1:5.

Because of the specific embodiments illustrating the practice of the present invention, a person having ordinary skill in the art can easily understand other advantages and efficiency of the present invention through the content disclosed therein. The present invention can also be practiced or applied by other variant embodiments. Many other possible modifications and variations of any detail in the present specification based on different outlooks and applications can be made without departing from the spirit of the invention.

The drawings of the embodiments in the present invention are all simplified charts or views, and only reveal elements relative to the present invention. The elements revealed in the drawings are not necessarily aspects of the practice, and quantity and shape thereof are optionally designed. Further, the design aspect of the elements can be more complex.

With reference to FIG. 1, it is a perspective view of experimental equipment in the present example. Numeral 1 is a $CO_2$ battle. Numeral 2 is a high-pressure reactor. Numeral 3 is a heater. Numeral 4 is a container for products. Numeral 5 is a reactant. The $CO_2$ battle 1 supplies $CO_2$ used for the formation of the supercritical fluid. The heater 3 increases the temperature of the high-pressure reactor 2 to the critical temperature of $CO_2$ and maintains the temperature. The high-pressure reactor 2 provides the place for receiving the reactant 5 and the supercritical fluid. The container 4 receives the products from the high-pressure reactor 2 after depressurization.

EXAMPLE 1

First, graphite powder was placed in the high-pressure reactor. $CO_2$ was used as a material to form a supercritical fluid. The high-pressure reactor was set at the temperature of 35° C. The $CO_2$ supercritical fluid was introduced into the high-pressure reactor and stood for 30 minutes. Meanwhile, the $CO_2$ supercritical fluid permeated into the graphite powder.

The pressure of the high-pressure reactor was set below the critical pressure of $CO_2$ (40 bar), at the critical pressure of $CO_2$ (74 bar), beyond but near the critical pressure of $CO_2$ (100 bar), and far beyond the critical pressure of $CO_2$ (300 bar), respectively. Posterior to the passage of the retention time, prompt depressurization was performed to make the $CO_2$ supercritical fluid expand, resulting in exfoliation of graphite to form graphene. During the depressurization, the product was guided by the $CO_2$ supercritical fluid into an aqueous solution containing SDS. Accordingly, the graphene prepared does not aggregate together to form graphite powder. The surface and the thickness of the graphene prepared from different pressures were observed respectively by transmission electron microscopy (TEM) and atomic force microscopy (AFM). The results are shown in FIGS. 2 and 3.

Figure 2:
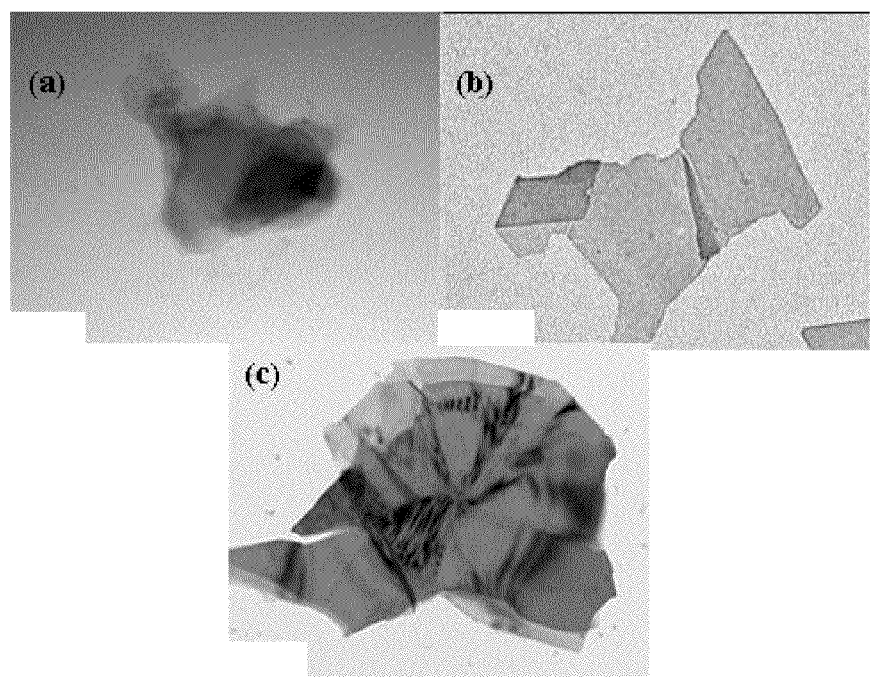
FIG. 2 shows transmission electron microscopic pictures of graphene given from Example 1 of the present invention, in which (a) shows graphene prepared at the pressure of 40 bar, (b) shows graphene prepared at the pressure of 100 bar, and (c) shows graphene prepared at the pressure of 300 bar.

FIG. 2 shows TEM pictures of graphene which was prepared from graphite treated with the $CO_2$ supercritical fluid and then dispersed in the aqueous solution containing SDS in the present example. In FIG. 2, (*a*) shows a TEM picture of graphene prepared at the pressure of 40 bar, (*b*) shows graphene prepared at the pressure of 100 bar, and (*c*) shows graphene prepared at the pressure of 300 bar. FIG. 2 demonstrates that the method of the present example can successfully produce graphene by the $CO_2$ supercritical fluid and the produced graphene does not aggregate to form graphite.

Figure 3:
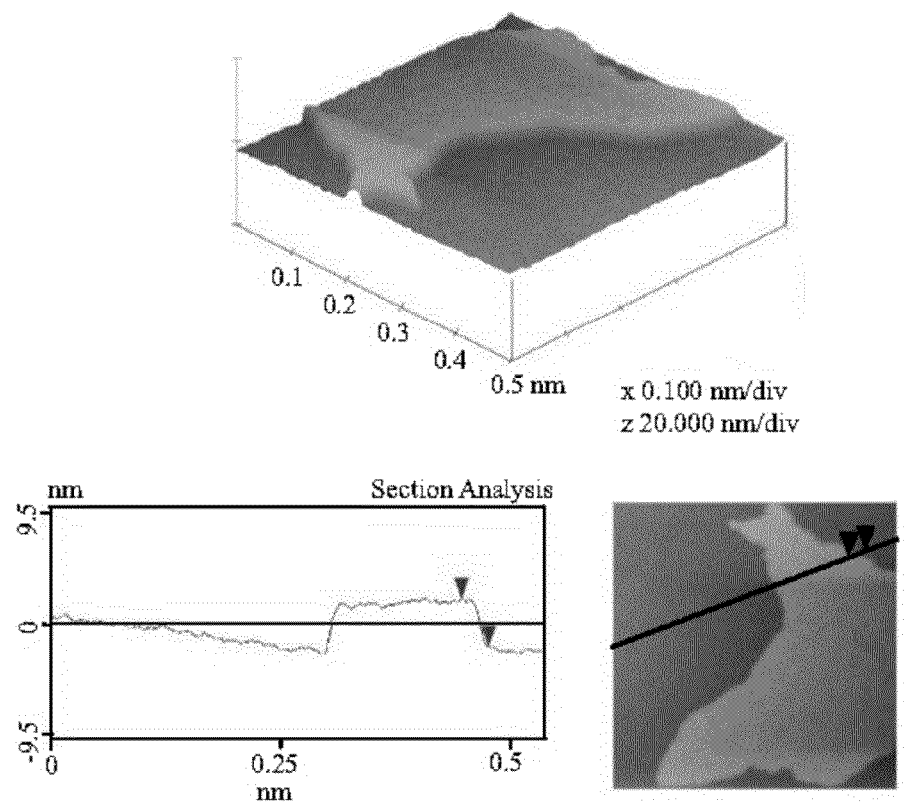
FIG. 3 shows atomic force microscopic pictures of graphene obtained from Example 1 of the present invention, in which the upper picture shows an atomic force microscopic 3D picture of FIG. 2(b), the lower-right picture shows an atomic force microscopic 2D picture of FIG. 2(b), and the lower-left curve shows the thickness of the line section shown in the lower-right picture.

In FIG. 3, the upper picture shows an atomic force microscopic 3D picture of FIG. 2(*b*), the lower-right picture shows an atomic force microscopic 2D picture of FIG. 2(*b*), and the lower-left curve shows the thickness of the line section shown in the lower-right picture. FIG. 3 demonstrates that the method of the present invention can form mono-layered graphene with uniform thickness.

EXAMPLE 2

First, graphite powder was uniformly mixed with SDS powder in the high-pressure reactor. The weight ratio of the graphite powder to the SDS powder ranged from 2:1 to 1:10. $CO_2$ was used as a material to form a supercritical fluid. The high-pressure reactor was set at the temperature of 35° C. The $CO_2$ supercritical fluid was introduced into the high-pressure reactor and stood for 30 minutes. Meanwhile, the $CO_2$ supercritical fluid dissolved SDS and guided SDS to permeate into the graphite powder.

The pressure of the high-pressure reactor was set at the critical pressure of $CO_2$ (74 bar) and beyond the critical pressure of $CO_2$ (150 bar), respectively. Posterior to the passage of the retention time, prompt depressurization was performed to make the $CO_2$ supercritical fluid expand resulting in exfoliation of graphite to form graphene. During the depressurization, the product was guided by the $CO_2$ supercritical fluid into an aqueous solution or water. Accordingly, SDS made the graphene prepared not aggregate together to form graphite powder in the aqueous solution. The surface of the graphene prepared from different pressures was observed by TEM. The results are shown in FIG. 4.

Figure 4:
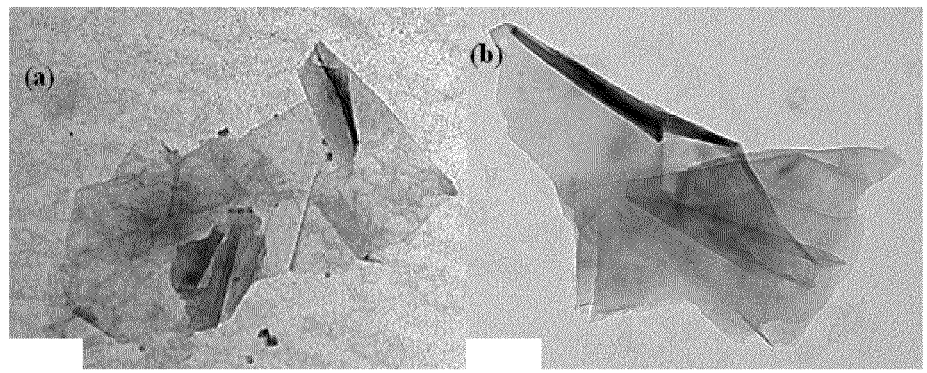
FIG. 4 shows transmission electron microscopic pictures of graphene given from Example 2 of the present invention, in which (a) shows graphene prepared at the pressure of 74 bar, and (b) shows graphene prepared at the pressure of 150 bar.

FIG. 4 shows TEM pictures of graphene which was prepared from the mixture of SDS and graphite treated with the $CO_2$ supercritical fluid and then dispersed in the aqueous solution or water in the present example. In FIG. 4, (*a*) shows a TEM picture of graphene prepared at the pressure of 74 bar, and (*b*) shows graphene prepared at the pressure of 150 bar. FIG. 4 demonstrates that the method of the present example, i.e. the preparation in which the mixture of SDS and graphite treated with the $CO_2$ supercritical fluid and then dispersed in the aqueous solution or water, can successfully produce graphene. Because the final product is dispersed in the aqueous solution or water, SDS dissolves in the water. SDS can interfere with the attraction of graphene, and thus graphene does not aggregate to form graphite.

EXAMPLE 3

First, graphite powder was uniformly mixed with ethanol in the high-pressure reactor. The ratio of the graphite powder to the ethanol ranged about from 0.01 g/100 ml to 10 g/100 ml.

$CO_2$ was used as a material to form a supercritical fluid. The high-pressure reactor was set at the temperature of 35° C. and at the critical pressure of $CO_2$ (74 bar). The $CO_2$ supercritical fluid was introduced into the high-pressure reactor. Meanwhile, the $CO_2$ supercritical fluid guided ethanol to permeate into the graphite powder. The retention times of the $CO_2$ supercritical fluid were 1 hour and 3 hours. Posterior to the passage of the retention times, prompt depressurization was performed to make the $CO_2$ supercritical fluid expand resulting in exfoliation of graphite to form graphene. Uniform dispersion of the ethanol made the produced graphene not aggregate to form graphite. The surface of the graphene prepared from different retention times was observed by TEM. The results are shown in FIG. 5.

Figure 5:
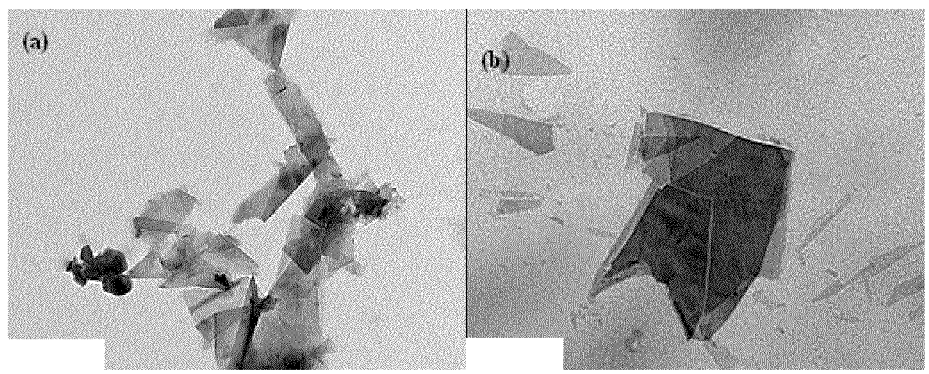
FIG. 5 shows transmission electron microscopic pictures of graphene given from Example 3 of the present invention, in which (a) shows graphene prepared in the retention time of one hour, and (b) shows graphene prepared in the retention time of 3 hours.

FIG. 5 shows TEM pictures of graphene which was prepared from the mixture of ethanol and graphite treated with the $CO_2$ supercritical fluid in the present example. In FIG. 5, (a) shows graphene prepared in the retention time of one hour, and (b) shows graphene prepared in the retention time of 3 hours. FIG. 5 demonstrates that the method of the present example can successfully produce graphene. Because uniform dispersion of the ethanol can interfere with the attraction of graphene, graphene does not aggregate to form graphite.

EXAMPLE 4

First, graphite powder was uniformly mixed with N-Methyl-2-pyrrolidone (NMP) in the high-pressure reactor. The proper ratio of the graphite powder to the NMP ranged about from 0.01 g/100 ml to 10 g/100 m.

$CO_2$ was used as a material to form a supercritical fluid. The high-pressure reactor was set at the temperature of 35° C. The $CO_2$ supercritical fluid was introduced into the high-pressure reactor and stood for 30 minutes. Meanwhile, the $CO_2$ supercritical fluid guided NMP to permeate into the graphite powder. The pressure of the high-pressure reactor was set below the critical pressure of $CO_2$ (50 bar), at the critical pressure of $CO_2$ (74 bar), and beyond the critical pressure of $CO_2$ (150 and 300 bar), respectively. Posterior to the passage of the retention time, prompt depressurization was performed to make the $CO_2$ supercritical fluid expand resulting in exfoliation of graphite to form graphene. Uniform dispersion of NMP made the graphene prepared not aggregate together to aggregate to form graphite powder. The surface of the graphene prepared from different pressures was observed by TEM. The results are shown in FIG. 6.

Figure 6:
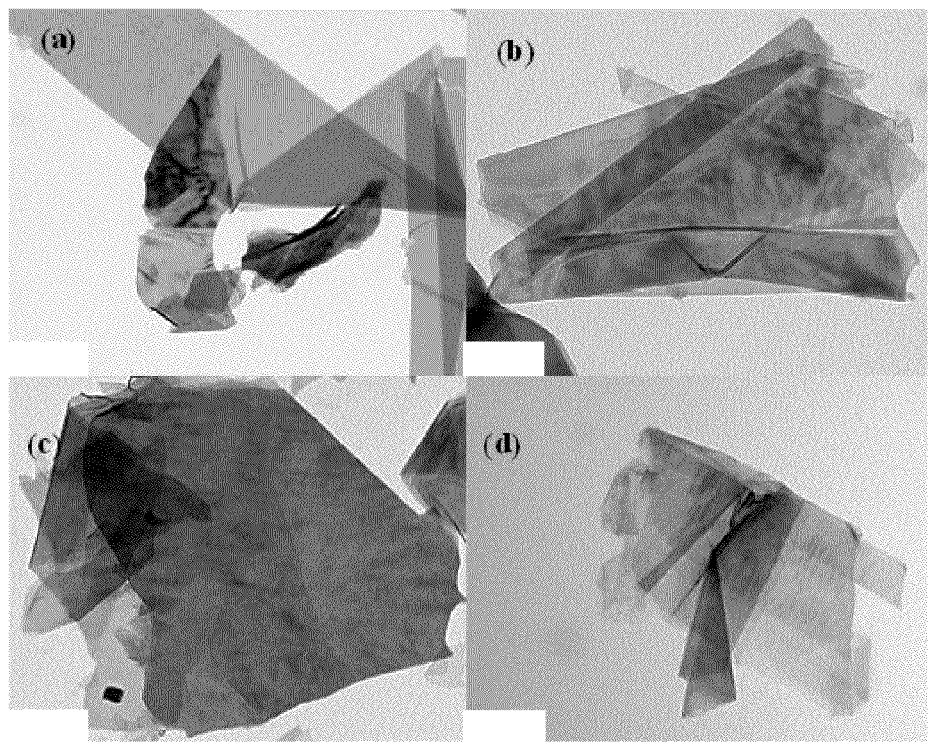
FIG. 6 shows transmission electron microscopic pictures of graphene given from Example 4 of the present invention, in which (a) shows graphene prepared at the pressure of 50 bar, (b) shows graphene prepared at the pressure of 74 bar, (c) shows graphene prepared at the pressure of 150 bar, and (d) shows graphene prepared at the pressure of 300 bar.

FIG. 6 shows TEM pictures of graphene which was prepared from the mixture of NMP and graphite treated with the $CO_2$ supercritical fluid in the present example. In FIG. 6, (a) shows a TEM picture of graphene prepared at the pressure of 50 bar, (b) shows graphene prepared at the pressure of 74 bar, (c) shows graphene prepared at the pressure of 150 bar, and (d) shows graphene prepared at the pressure of 300 bar. FIG. 6 demonstrates that the method of the present example can successfully produce graphene. NMP can interfere with the attraction of graphene, and thus graphene does not aggregate to form graphite.

In conclusion, the method of the present invention allows the mixture of graphite and an organic solvent, a surfactant, or a combination thereof to be treated with a supercritical fluid, or allows graphite to be treated alone with the supercritical fluid and then to be dispersed in the organic solvent, a surfactant-containing organic solvent, or a surfactant-containing aqueous solution. The graphene produced according to the method can not aggregate to form graphite owing to the interference of the organic solvent and the surfactant, and its surface is not functionalized. Besides, the method includes simple and uncomplicated steps and can be applied to mass production. Accordingly, the method of the present invention can avoid the drawbacks of the conventional techniques.

Although the present invention has been explained in relation to its preferred embodiment, it is to be understood that many other possible modifications and variations can be made without departing from the scope of the invention as hereinafter claimed.

What is claimed is:

1. A method for manufacturing graphene, comprising the following steps:
   putting a surfactant and graphite material in a reaction tank, and introducing a supercritical fluid in the reaction tank to allow the surfactant to dissolve in the supercritical fluid and to permeate into the graphite material;
   removing the supercritical fluid by depressurization to form graphene; and
   introducing the graphene into an aqueous solution at the time of removing the supercritical fluid by depressurization.

2. The method as claimed in claim 1, wherein a ratio of the graphite material to the surfactant is in a range from 2:1 to 1:10 by weight.

3. The method as claimed in claim 1, wherein the graphite material is graphite powder of which particle size is in a range from 20 to 100 μm.

4. The method as claimed in claim 1, wherein retention time of the supercritical fluid introduced in the reaction tank is in a range from 15 minutes to 24 hours.

5. The method as claimed in claim 1, wherein rate of the depressurization of the supercritical fluid is in a range from 0.1 to 5 mL/s.

6. The method as claimed in claim 1, wherein the supercritical fluid is removed within 5 seconds to within 5 hours.

7. The method as claimed in claim 1, wherein the surfactant is an anionic surfactant, a cationic surfactant, a nonionic surfactant, or a combination thereof.

8. A method for manufacturing graphene, comprising the following steps:
   putting graphite material in a reaction tank, and introducing a supercritical fluid in the reaction tank; and
   removing the supercritical fluid by depressurization to form graphene, and simultaneously to introduce the graphene into an organic solvent, a surfactant-containing organic solvent, or a surfactant-containing aqueous solution.

9. The method as claimed in claim 8, wherein the graphite material is graphite powder of which particle size is in a range from 20 to 100 μm.

10. The method as claimed in claim 8, wherein retention time of the supercritical fluid introduced in the reaction tank is in a range from 15 minutes to 24 hours.

11. The method as claimed in claim 8, wherein rate of the depressurization of the supercritical fluid is in a range from 0.1 to 5 mL/s.

12. The method as claimed in claim 8, wherein the supercritical fluid is removed within 5 seconds to within 5 hours.

13. The method as claimed in claim 8, wherein the organic solvent is selected from $C_{1-5}$ alcohol, $C_{2-6}$ ester, $C_{3-7}$ ketone, and $C_{5-9}$ alkane, or a combination thereof.

14. The method as claimed in claim 8, wherein the surfactant is an anionic surfactant, a cationic surfactant, a nonionic surfactant, or a combination thereof.

* * * * *